United States Patent [19]
Stiebel

[11] Patent Number: 4,893,005
[45] Date of Patent: Jan. 9, 1990

[54] METHOD AND APPARATUS FOR AREA AND PERIMETER SECURITY WITH REFLECTION COUNTING

[75] Inventor: Ariel Stiebel, Bloomfield Hills, Mich.

[73] Assignee: Development/Consulting Associates, Troy, Mich.

[21] Appl. No.: 147,113

[22] Filed: Jan. 21, 1988

Related U.S. Application Data

[63] Continuation of Ser. No. 850,725, Apr. 11, 1986, abandoned.

[51] Int. Cl.⁴ .............................................. G01V 9/04
[52] U.S. Cl. ................................ 250/221; 250/222.1; 340/556
[58] Field of Search .......................... 250/221, 222.1; 340/555, 556, 557, 573

[56] References Cited

U.S. PATENT DOCUMENTS

| | | | |
|---|---|---|---|
| 2,269,340 | 1/1942 | Gulliksen | 250/41.5 |
| 3,120,654 | 2/1964 | Lee | 250/221 |
| 3,641,549 | 2/1972 | Misek et al. | 250/221 |
| 3,805,064 | 4/1974 | Kornylak | 250/221 |
| 3,955,184 | 5/1976 | Cinzori et al. | 250/221 |
| 3,987,428 | 10/1976 | Todeschin | 250/578 |
| 4,179,691 | 12/1979 | Keller | 250/221 |
| 4,224,608 | 9/1980 | Lederer | 340/556 |
| 4,310,756 | 1/1982 | Sick et al. | 250/221 |
| 4,310,836 | 1/1982 | Stanzani | 340/556 |
| 4,314,239 | 2/1982 | Odone et al. | 340/556 |
| 4,319,332 | 3/1982 | Mehnert | 340/556 |

Primary Examiner—David C. Nelms
Attorney, Agent, or Firm—Gifford, Groh, Sheridan, Sprinkle and Dolgorukov

[57] ABSTRACT

An apparatus and method for detecting disturbance in a protected area or perimeter by scanning the area or perimeter with a rotating beam of radiating energy, such as light, infrared, ultraviolet and the like, and counting the number of pulses at the output of a detector or sensor upon impingement on the detector or sensor of the beam reflected by each one of a plurality of reflectors disposed in the protected area or perimeter. Upon turning on the apparatus, a first pulse count corresponding to each complete revolution of the beam is stored as a pulse reference number for a "normal" state in the protected area or perimeter. In operation, the number of pulses for each revolution of the beam is continuously counted and compared to the stored reference number and an alarm is triggered as soon as the stored reference number and the counted number are unequal.

10 Claims, 1 Drawing Sheet

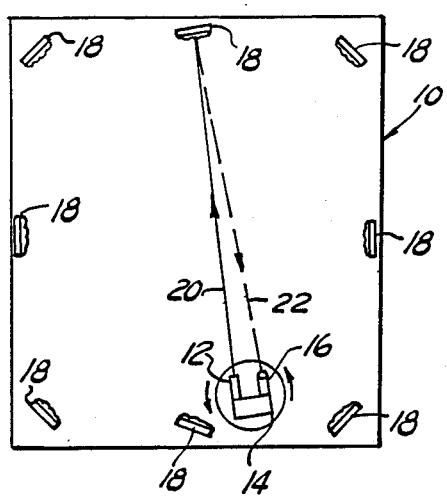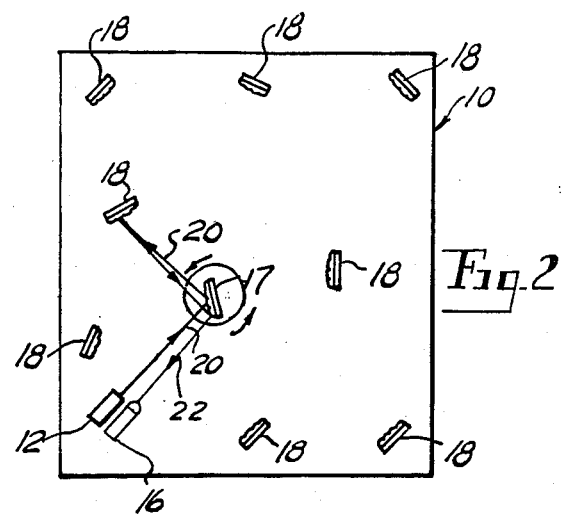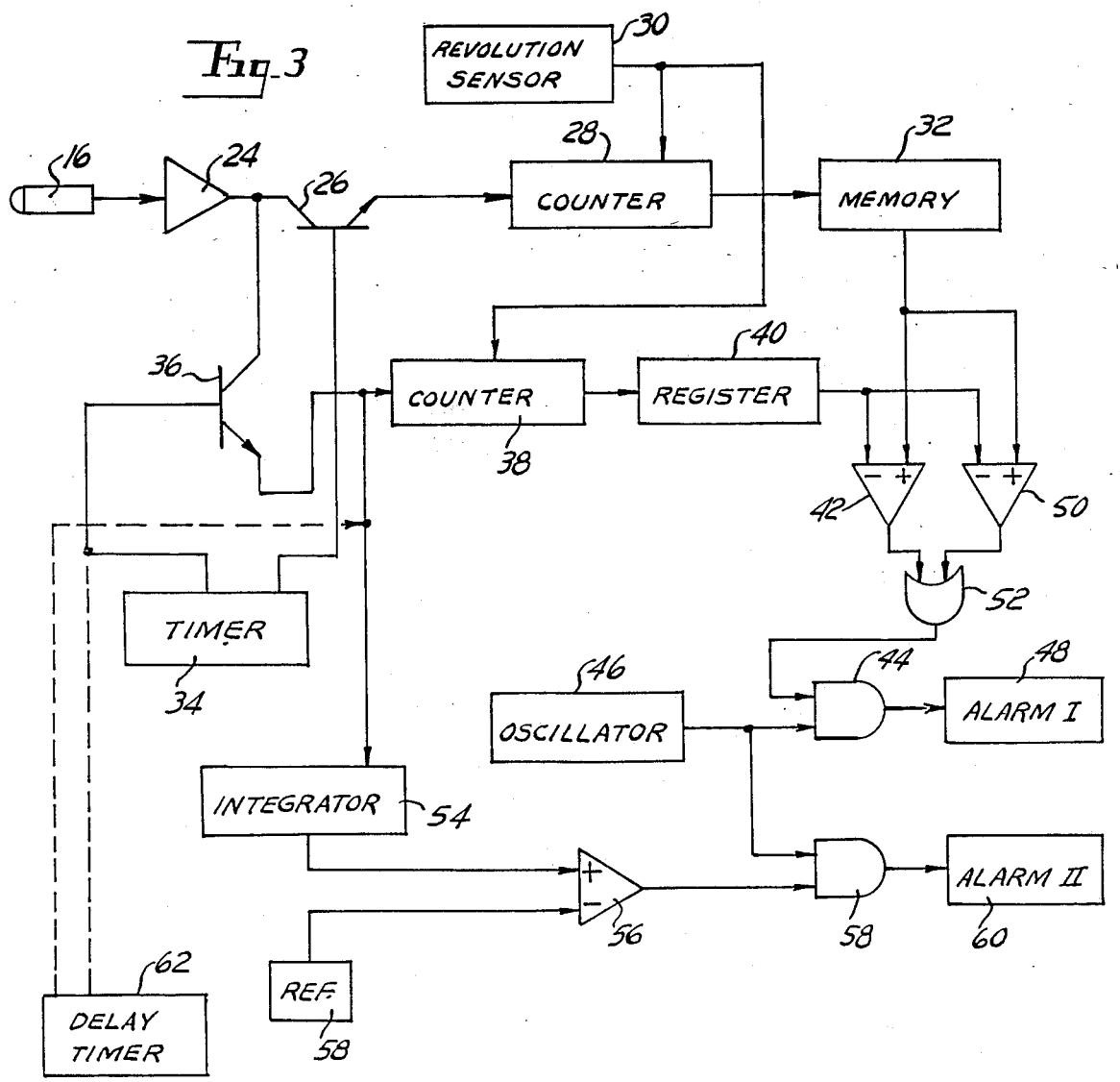

METHOD AND APPARATUS FOR AREA AND PERIMETER SECURITY WITH REFLECTION COUNTING

This is a continuation of co-pending application Ser. No. 850,725 filed on Apr. 11, 1986, now abandoned.

BACKGROUND OF THE INVENTION

The present invention relates to a method and apparatus for monitoring the integrity of an area and perimeter and for detecting intrusion within the monitored area or perimeter.

Area and perimeter monitoring and intrusion detecting devices are known which rely on the interruption of a light beam, either direct or reflected light beam, for detecting unauthorized intrusion through a door or window of a protected enclosure. Such devices generally consist of a plurality of light beams coupled with appropriate light detectors, strategically disposed over the protected area, or they take the form of radiation curtains with a plurality of radiation emitters aimed at sensors such that when one of the light or radiation beams is interrupted, an alarm is given.

One disadvantage associated with such systems is that they require a plurality of light or radiation emitters associated with a plurality of light or radiation detectors, and any malfunction of one of the elements causes a false alarm, or completely deactivates the system. In addition, they are easily defeated by skilled intruders as the diverse light beam or radiation emitters, and associated sensors, are stationary and the relatively narrow beams of light or other radiation have defined trajectories which may easily be avoided by crawling underneath the beams or jumping over the beams.

SUMMARY OF THE INVENTION

The present invention provides an intrusion detection apparatus and method which use a single radiation beam emitter coupled with a single radiation beam detector. The radiation beam is continuously rotated in a plane such as to scan or paint the area or perimeter being protected, and is reflected by strategically disposed reflectors, such as to provide full coverage of the area under surveillance. It is thus extremely difficult for an intruder to take counter-measures for avoiding detection.

A significant object of the invention is to provide a definition of a "normal" state in the area or perimeter under surveillance each time the intrusion detector is activated, to compare a stored representation of such normal state with an actual state detected in real time, and to provide an alarm as soon as the actual state differs from the normal state.

Another important aspect of the invention is to provide monitoring of any area or perimeter of any size by way of a single radiation emitter and of a single radiation sensor coupled with a plurality of passive elements, such as mirrors or beam reflectors strategically placed at any appropriate locations around the area or perimeter being protected, thus reducing considerably the number of malfunctions or false alarms.

A further object of the present invention is to provide an intrusion detection apparatus which is simple in structure, which can be manufactured at low cost, which relies on a simple microprocessor chip for its operation, which is highly reliable, which is easy to install and whose function is difficult to be tampered with.

The many objects and advantages of the present invention will become apparent to those skilled in the art when the following description of an example of the best mode contemplated at the present for practicing the invention is read in conjunction with the accompanying drawing wherein:

BRIEF DESCRIPTION OF THE DRAWING

FIG. 1 is a schematic illustration of an intrusion detection system according to the present invention;

FIG. 2 is a modification of the schematic illustration of FIG. 1; and

FIG. 3 is a simplified schematic circuit diagram of an example of circuitry associated with the intrusion detection system of FIG. 1.

DETAILED DESCRIPTION OF THE PREFERRED EMBODIMENT

Referring now to the drawing, and more particularly to FIG. 1, there is schematically illustrated an area or enclosure 10 that is desired to be secured against intrusion. A radiation beam emitter or transmitter 12 is installed at any convenient location in the area or enclosure 10 on a rotating support or turntable 14, on which is also mounted a radiation beam sensor or detector 16. A plurality of reflectors 18 are installed at appropriate locations about the perimeter of the area or enclosure 10 such that the direct radiation beam 20 emitted by the rotating radiation beam transmitter 12, when reflected by a reflector 18, impinges upon the detector 16 as a reflected beam 22. Alternatively, and as illustrated at FIG. 2, the radiation beam emitter 12 and the radiation beam detector 16 are installed in a fixed position and the beams, and the direct beam 20 is rotated such as to scan or paint the area or perimeter to be secured, by a rotating mirror or prism 17, FIG. 2. As the direct radiation beam 20 rotates, every time the beam 20 is reflected by a reflector 18 as a reflected beam 22 impinging on the detector 16, a pulse is provided at the output of the detector 16.

In the examples illustrated at FIGS. 1 and 2, there are eight reflectors 18, such that for each revolution of the beam 20, eight pulses could, theoretically, be supplied at the output of the detector 16. In reality, there may be more than eight pulses supplied at the output of the detector 16 as a result of multiple reflection of the direct radiation beam 20 or less than eight pulses due to objects masking either the direct radiation beam 20 or the reflected beam 22.

It will be appreciated that the rotating support or turntable 14 for the beam transmitter 12 and detector 16, FIG. 1, or the mirror or prism 17, FIG. 2, is driven in rotation at any chosen angular velocity by an appropriate electric motor, not shown, and that the assembly can be installed suspended from the ceiling of a room, for example, or disposed on a support such as a table, or a post, and that it can be hidden so as to take any inconspicuous appearance if so desired. The beam of radiation may be a light beam, an infrared or ultraviolet beam, a laser beam, a high frequency RF beam or any appropriate energy beam which can be emitted directionally and in a relatively narrow beam. The narrow radiation beam has nevertheless a certain amount of divergence or conicity from the transmitter 12 outwardly, such that the direct beam scans a volume limited by inverted conical planes each having its apex substantially at the source of radiation at the transmitter 12. The detector 16 is preferably aimed along the median plane of the two inverted conical planes.

When the intrusion detection system of the invention is turned on, the direct radiation beam 20 is caused to scan or paint the secured area or perimeter. As the rotating beam 20 hits consecutive reflectors 18, the reflected beam 22 impinges upon the detector 16, thus providing a pulse signal at the output of the detector 16.

As schematically illustrated at FIG. 3, the detector 16 is connected through a pulse amplifier 24 and a transistor switch 26, for example, to a counter 28. Upon turning on the intrusion detection system and simultaneously with energizing the drive motor of the turntable 14, or the drive motor of the rotatable mirror or prism 17, and the beam transmitter 12, the transistor switch 26 is turned on, thus applying the pulses detected by the detector 16 to the counter 28 which counts the number of pulses corresponding to one revolution of the rotating beam 20. For that purpose, a revolution sensor 30 is provided for resetting the counter 28 at the end of each complete revolution of the direct beam 20. The number of pulses counted by the counter 28 for each revolution of the direct beam 20 is stored in a memory 32. Irrespective of the angular start position of the direct beam 20, after the counter 28 has been reset once the number of pulses stored in the memory 32 corresponds to the number of pulses counted for each complete revolution of the direct beam 20 and is a representation of a normal steady state for the protected area, irrespective of the number of reflected beam impingements detected by the detector 16 and appearing as pulses at the output of the detector 16.

After a predetermined period of time to establish a repetitive constant number of counted pulses, the switch transistor 26 is automatically biased to a nonconductive state by a timer 34 which simultaneously biases a second transistor switch 36 to conductance, such that the amplified pulses appearing at the output of the amplifier 24 are applied to a second counter 38 connected to the output of the amplifier 24 via the second transistor switch 36. The second counter 38 is reset for each full revolution of the turntable 14 or of the mirror or prism 17, i.e. for each full revolution of the beam. The number of pulses counted by the counter 38 for each revolution of the beam is stored in a register 40 and compared in a comparator 42 to the number stored in the memory 32. As long as the numbers stored in the memory 32 and in the register 40 are the same, no signal appears at the output of the comparator 42. However, if there has been an intrusion in the secured area 10, the direct beam 20 or the reflected beam 22, FIGS. 1 and 2, becomes masked by the intruder, or disturbed in some manner, for example by opening a door or a window on which a reflector 18 is installed, such that at least one pulse is missing during one revolution of the direct beam 20. The number of pulses counted by the counter 38 and stored in the register 40 is therefore less than the "normal" number of pulses stored in the memory 32, with the result that a signal appears at the output of the comparator 42. The signal appearing at the output of the comparator 42 is applied to an input of an AND gate 44 to enable the gate, such that the signal at the output of an oscillator 46, supplied to the other input of the AND gate 44, appears at the output of the AND gate 44 and triggers an alarm 48.

It will be appreciated that by providing a second comparator, for example, having an input connected to the memory 32 and another input connected to the register 40, a signal may be provided at the output of a second comparator 50 when the number of pulses stored in the register 40 exceeds the number of pulses, representing the normal state, stored in the memory 32. Such is the case if the intrusion in the protected area 10 is of such nature as to provide an additional reflection of the rotating beam 20, or multiple reflections of the beam, or emits an extraneous beam to which the detector 16 is sensitive with the result that the detector 16 supplies at its output one or more additional pulses during a single revolution of the direct beam 20. With such an arrangement, the outputs of the comparators 42 and 50 may be applied through an OR gate 52 to one of the inputs of the AND gate 44. An alarm is thus triggered any time the "nornal" state of the area is disturbed, i.e. any time the number of pulses detected during one revolution of the direct beam 20 is less than or exceeds the number of pulses stored in the memory 32.

As an additional feature, the invention may also be used as a smoke detector, for example, simply by applying the pulse signals appearing at the output of the amplifier 24 thorugh the transistor switch 36 to an integrator 54 averaging the amplitude of the pulse signals, for example by determining the average Dc voltage level of the pulse signals. The signal appearing at the output of the integrator 54 is applied to an input of a comparator 56 in which it is compared to a reference value, obtained from an adjustable refernce value source 58, applied to the other input of the comparator 56. If dust or smoke is present in the area or enclosure 10 under surveillance, the intensity, or amplitude, of the pulse signals at the output of the beam detector 16, and consequently at the output of the amplifier 24, is less than the amplitude of normal signals, as a result of the absorption and dispersion of the beam caused by the smoke or dust particles floating in the atmosphere of the area or enclosure 10. By setting the reference value at the output of the reference value source 58 at a predetermined threshold, when the pulse signals detected and averaged by the integrator 54 drop to the reference value, a signal appears at the output of the comparator 56 which is applied to an input of an AND gate 58, enabling the AND gate 58 such that the oscillator 46 connected to the other input of the AND gate 58 triggers a second alarm 60 connected to the output of the AND gate 58.

The intrusion detection system of the invention is remotely activated when it is desired to secure the area or perimeter to be protected. Alternatively, the system may be activated by a delayed timer that biases both the transistor switches 26 and 36 for a predetermined period of time giving the person arming the system an opportunity to exit the secured area or perimeter prior to fully arming the system for normal operation. After a count of pulses corresponding to a normal state of the area or perimeter is stored in the memory 32, it remains in the memory 32 until the system is deactivated, at which time the number stored in the memory 32 is erased and the memory is reset ready to store a new number of pulses corresponding to the normal state each time the system is activated.

It will be appreciated by those skilled in the art that the circuit diagram of FIG. 3 has been given for illustrative purpose only and that many modifications are readily apparent, including, but not limited to, purely digital circuits, by means of appropriate analog to digital converters, such as for example Schmitt trigger circuits at the output of the amplifier 24. It will also be appreciated that the whole circuit may be produced in the form of a simple chip.

Having thus described the present invention by way of examples of practical embodiments thereof, modifications whereof will be apparent to those skilled in the art, what is claimed as new is as follows:

I claim:

1. A method for detecting disturbance in a protected area or perimeter, said method comprising emitting a beam of radiation along a predetermined path, rotating said beam of radiation for a complete revolution along said predetermined path, positioning a plurality of individual reflectors along said predetermined path within said area or perimeter, counting a base number of beam reflections for said complete revolution of said beam after activation, storing said base number for establishing a beam reflection number corresponding to a normal state in said area or perimeter, counting a number of beam reflections for each subsequent revolution of said beam, comparing said counted number with said stored base number, and triggering an alarm when said counted number is different from said stored base number.

2. The method of claim 1 wherein said alarm is triggered when said counted number is smaller than said stored base number.

3. The method of claim 1 wherein said alarm is triggered when said counted number is larger than said stored base number.

4. The method of claim 1 further comprising detecting the average value of said beam reflections, comparing said average value to a reference value, and triggering an alarm when said average value is at most equal to said reference value.

5. An apparatus for detecting disturbance in a protected are or perimeter, said apparatus comprising:
   a transmitter directionally emitting a radiation beam;
   means for rotating said radiation beam to direct said radiation beam along a predetermined path;
   a plurality of beam reflectors disposed within the protected area or perimeter along said predetermined path, whereby each of said plurality of beam reflectors reflects a portion of said radiation beam when said beam makes contact with one of said plurality of beam reflectors;
   a reflected beam detector for receiving said portion of said radiation beam reflected by said plurality of beam reflectors;
   means for determining the number of said plurality of beam reflectors which are unobscured and capable of being contacted by said radiation beam at the time of initiation of said apparatus, said means for detecting comprising:
   means for counting and storing a base number of beam reflections from said unobscured reflectors received by said detector during a complete revolution of said radiation beam along said predetermined path, whereby said base number corresponds to a normal state in said protected area or perimeter, and said base number of beam reflections being dependent upon the number of said plurality of beam reflectors contacted by said radiation beam during said complete revolution of said radiation beam after activation of said apparatus
   means for measuring a counted number of beam reflections received by said detector for each subsequent revolution;
   means for comparing said base number with said counted number of beam reflections for each subsequent revolution, said means for comparing generating a signal when said base number differs from said counted number whereby a disturbance is detected;
   means for triggering an alarm in response to said signal; and
   means for resetting said base number after said apparatus is deactivated and reactivated whereby a new normal state is established dependent upon the number of said plurality of beam reflectors which are open to contact by said radiation beam along said predetermined path.

6. The apparatus of claim 5 wherein said means for rotating said radiation beam includes means for rotating said transmitter and said reflected beam detector.

7. The apparatus of claim 5 wherein said means for rotating said radiation beam includes rotating reflection means which receives said transmitted radiation beam and reflects it to said plurality of beam reflectors.

8. The apparatus of claim 5 wherein said alarm is triggered when said counted number is smaller than said base number.

9. The apparatus of claim 5 wherein said alarm is triggered when said counted number is larger than said base number.

10. The apparatus of claim 5 further comprising means for detecting an average value of said counted pulses, means for comparing said average value to a reference value, and means for triggering an alarm when said detected average value is at most equal to said reference value.

* * * * *

UNITED STATES PATENT AND TRADEMARK OFFICE
CERTIFICATE OF CORRECTION

PATENT NO. : 4,893,005

DATED : Jan. 9, 1990

INVENTOR(S) : Ariel Stiebel

It is certified that error appears in the above-identified patent and that said Letters Patent is hereby corrected as shown below:

Column 4, line 23, delete "thorugh" and insert --through--;

line 29, delete "refernce" and insert --reference--.

Column 5, Claim 5, Line 36, delete "are" and insert --area--.

Signed and Sealed this

Eleventh Day of December, 1990

*Attest:*

HARRY F. MANBECK, JR.

*Attesting Officer*  *Commissioner of Patents and Trademarks*